(12) United States Patent
Ogale

(10) Patent No.: US 11,383,407 B2
(45) Date of Patent: Jul. 12, 2022

(54) LAYUP AND FABRICATION OF TOWS OF BRAIDED FIBER FOR HYBRID COMPOSITE PARTS

(71) Applicant: The Boeing Company, Chicago, IL (US)

(72) Inventor: Amol Ogale, Munich (DE)

(73) Assignee: The Boeing Company, Chicago, IL (US)

( * ) Notice: Subject to any disclaimer, the term of this patent is extended or adjusted under 35 U.S.C. 154(b) by 445 days.

(21) Appl. No.: 16/456,676

(22) Filed: Jun. 28, 2019

(65) Prior Publication Data
US 2020/0406506 A1    Dec. 31, 2020

(51) Int. Cl.
| B29B 11/16 | (2006.01) |
| B29B 13/02 | (2006.01) |
| B29C 70/20 | (2006.01) |
| B29C 70/32 | (2006.01) |
| B29C 70/22 | (2006.01) |
| B29K 71/00 | (2006.01) |
| B29K 307/04 | (2006.01) |

(52) U.S. Cl.
CPC .............. *B29B 11/16* (2013.01); *B29B 13/02* (2013.01); *B29C 70/20* (2013.01); *B29C 70/22* (2013.01); *B29C 70/32* (2013.01); *B29K 2071/00* (2013.01); *B29K 2307/04* (2013.01)

(58) Field of Classification Search
None
See application file for complete search history.

(56) References Cited

U.S. PATENT DOCUMENTS

| 2,351,039 | A | * | 6/1944 | Hanson | D04C 1/00 |
| | | | | | 28/155 |
| 3,076,252 | A | * | 2/1963 | Hofmann | B29C 66/8161 |
| | | | | | 156/88 |
| 4,264,278 | A | | 4/1981 | Weingart | |
| 4,385,952 | A | * | 5/1983 | Futakuchi | B29C 53/66 |
| | | | | | 156/174 |
| 4,407,885 | A | * | 10/1983 | Murphy | D06M 23/06 |
| | | | | | 442/212 |
| 4,734,146 | A | * | 3/1988 | Halcomb | B29C 69/003 |
| | | | | | 156/148 |
| 5,078,821 | A | | 1/1992 | Garvey et al. | |
| 5,344,689 | A | | 9/1994 | Ide et al. | |
| 9,163,353 | B2 | * | 10/2015 | Lin | B26D 7/086 |

(Continued)

FOREIGN PATENT DOCUMENTS

| EP | 1584451 A1 | 10/2005 |
| EP | 3009468 A2 | 4/2016 |
| EP | 3009468 A3 | 7/2016 |

OTHER PUBLICATIONS

Automated Fiber Placement; Wikipedia Apr. 26, 2019.
(Continued)

*Primary Examiner* — Jeffry H Aftergut
(74) *Attorney, Agent, or Firm* — Duft & Bornsen, PC

(57) ABSTRACT

Systems and methods are provided for fabricating a laminate. One method includes laying up a first set of layers comprising tows of unidirectional thermoplastic fiber-reinforced material for the laminate, and laying up a second set of layers comprising tows of braided thermoplastic fiber-reinforced material for the laminate.

33 Claims, 11 Drawing Sheets

(56) References Cited

U.S. PATENT DOCUMENTS

| | | | |
|---|---|---|---|
| 2005/0257887 A1* | 11/2005 | Tsotsis | B32B 37/182 |
| | | | 156/308.2 |
| 2006/0073311 A1 | 4/2006 | Hogg | |
| 2012/0114899 A1 | 5/2012 | Ellis | |
| 2016/0010248 A1* | 1/2016 | Lariviere | D04C 1/12 |
| | | | 87/7 |
| 2016/0023433 A1 | 1/2016 | Langone et al. | |
| 2019/0113158 A1 | 4/2019 | Zhou et al. | |

OTHER PUBLICATIONS

Braided Composited; https://www.highlandcomposites.com/innovation/braided-composites; Apr. 26, 2019.
QISO Braided Triaxial Fabric; A & P Technology; www.braider.com/Products/QUISO-Braided-Triaxial-Fabric.aspx; Jan. 29, 2019.
European Search Report; Application EP20168826; dated Sep. 28, 2020.

* cited by examiner

LAYUP AND FABRICATION OF TOWS OF BRAIDED FIBER FOR HYBRID COMPOSITE PARTS

FIELD

The disclosure relates to the field of fabrication, and in particular, to fabrication of fiber reinforced composite parts via the layup of tows.

BACKGROUND

Multi-layer laminates of constituent material (e.g., Carbon Fiber Reinforced Polymer (CFRP)) may be formed into any of a variety of shapes for hardening into a composite part. A laminate may be laid-up in layers that each comprise a tow of unidirectional fiber-reinforced material. Laminates may be laid-up by hand, by an Automated Tape Layup Machine (ATLM), or by an Automated Fiber Placement (AFP) machine.

While laminates provide desired levels of performance when hardened into composite parts, layup processes for laminates remain complicated and time-consuming. Furthermore, techniques for affixing laminates together, such as induction welding, may be difficult to perform upon laminates made from such materials. For example, heating a laminate made from these materials via induction may require more current to be run through an induction coil than is desirable.

Therefore, it would be desirable to have a method and apparatus that take into account at least some of the issues discussed above, as well as other possible issues.

SUMMARY

Embodiments described herein provide for tows that comprise braided fibers for a laminate. The tows are pre-impregnated with thermoplastic, and may be laid-up by an ATLM or AFP machine. Furthermore, because the fibers are conductive, intersections between the fibers generate heat in response to applied magnetic fields. This increases the amount of heating at the tows during induction welding, as compared to tows of unidirectional fiber.

One embodiment is a method for fabricating tows of braided thermoplastic fiber-reinforced material. The method includes braiding pre-impregnated fibers of unidirectional material to form a weave having a circumference that forms a closed cross-sectional shape around a mandrel, tacking the pre-impregnated fibers at tacking positions along the circumference, and cutting the weave at a cut position between the tacking positions, with a knife that proceeds in the process direction along the length of the weave and is disposed behind the rollers.

A further embodiment is a non-transitory computer readable medium embodying programmed instructions which, when executed by a processor, are operable for performing a method. The method includes braiding pre-impregnated fibers of unidirectional material to form a weave having a circumference that forms a closed cross-sectional shape around a mandrel, tacking the pre-impregnated fibers at tacking positions along the circumference, and cutting the weave at a cut position between the tacking positions, with a knife that proceeds in the process direction along the length of the weave and is disposed behind the rollers.

A further embodiment is an apparatus for fabricating tows of braided thermoplastic fiber-reinforced material. The apparatus includes rollers that apply heat and pressure at tacking positions along a circumference of a weave of braided pre-impregnated fibers of unidirectional material that is laid-up at a cylindrical mandrel, and that proceed in a process direction along a length of the weave, and a knife that cuts the weave at a cut position between the tacking positions, proceeds in the process direction along the length of the weave, and is disposed behind the rollers.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite part along different dimensions. The preform may include a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated.

Figure 1:
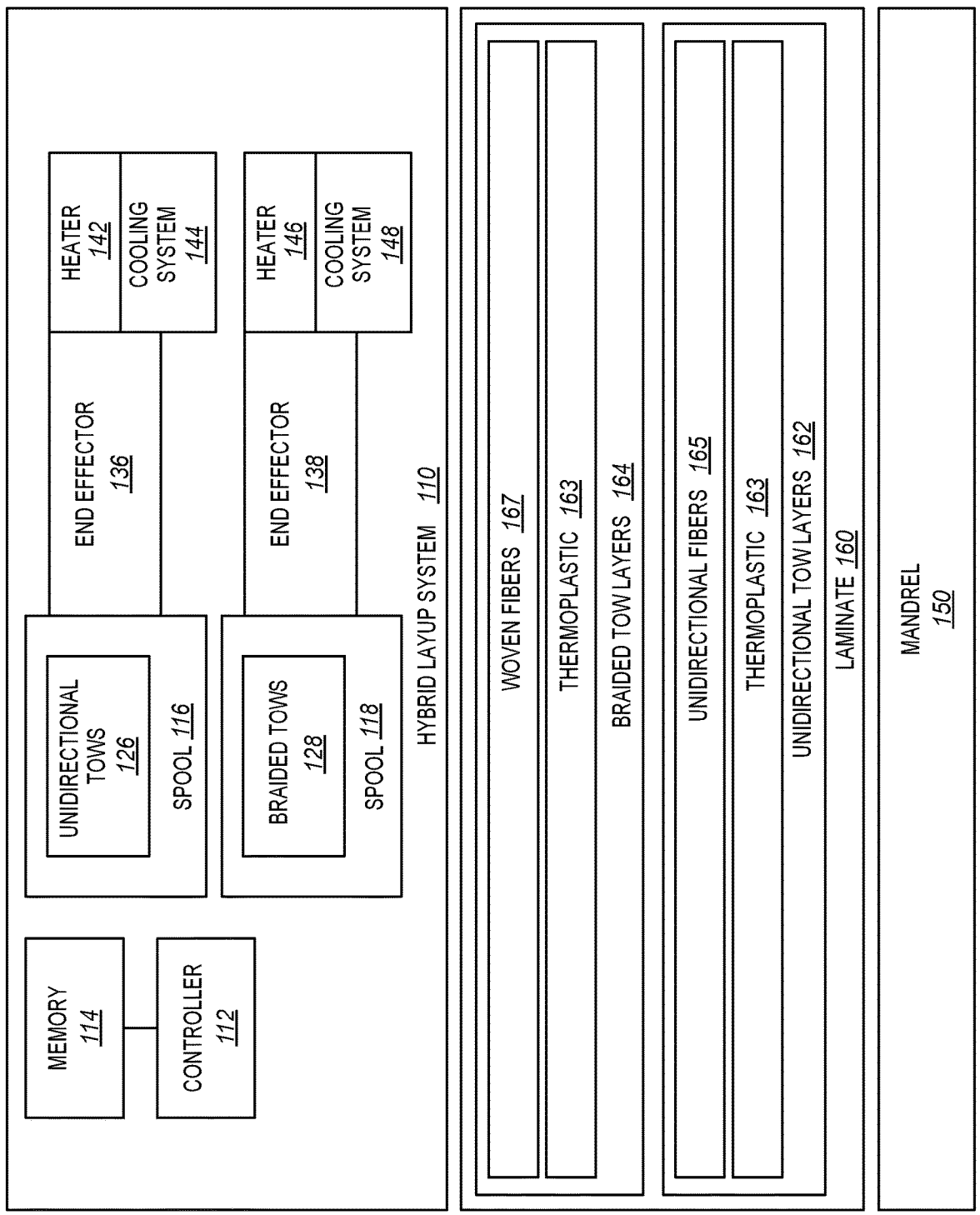
FIG. 1 is a block diagram of a fabrication environment in an illustrative embodiment.

FIG. 1 is a block diagram of a fabrication environment 100 that includes a hybrid layup system 110 in an illustrative embodiment. Hybrid layup system 110 comprises any system or device that is capable of laying up unidirectional tows 126 (i.e., tows of unidirectional fiber) and braided tows 128 (i.e., tows of braided fibers) to form a laminate 160 having both unidirectional fiber layers and braided fiber layers. The braided tows 128 may be biasedly braided, in order to exhibit any desired combination of fiber orientations that are not parallel or perpendicular to the length of the tow. For example, the fiber orientations may be +22°/−22°, +45°/−45°, +10°/−10°, +80°/−80°, etc. Furthermore, the fibers in each of the tows of braided thermoplastic fiber-reinforced material may form an open weave, a closed weave, or any desired pattern.

According to FIG. 1, hybrid layup system 110 includes controller 112 and memory 114. Controller 112 directs the operations of hybrid layup system 110, and memory 114 stores instructions (e.g., a Numerical Control (NC) program) for operating the hybrid layup system 110. Controller 112 may be implemented, for example, as custom circuitry, as a hardware processor executing programmed instructions, or some combination thereof.

Hybrid layup system 110 also includes a spool 116, which stores unidirectional tows 126 (e.g., tows of unidirectional fiber pre-impregnated with thermoplastic), and a spool 118 which stores braided tows 128 (e.g., tows of braided fiber pre-impregnated with thermoplastic). Each other tows described herein may comprise a linear, integral tape that extends for tens or hundreds of feet. End effector 136 lays up unidirectional tows 126, and end effector 138 lays up braided tows 128. Heaters 142 and 144 (e.g., radiant heaters, lasers, etc.) and cooling systems 144 and 148 (e.g., fans, cold mandrels, etc.) facilitate the layup process as described below with regard to FIG. 3. The tows described herein may comprise "dry fiber" tows secured with a binder or tackifier, or tows that are pre-impregnated with thermoplastic.

Laminate 160 is laid-up by hybrid layup system 110 onto mandrel 150, and includes both unidirectional tow layers 162 and braided tow layers 164. Unidirectional tow layers 162 include thermoplastic 163 (e.g., polyetheretherketone (PEEK), polyetherketoneketone (PEKK)) and unidirectional fibers 165, while braided tow layers 164 include thermoplastic 163 and woven fibers 167. As used herein, braided/woven fibers are fibers which are interwoven with each other to form a pattern. These patterns may include open weaves, closed weaves, triaxial weaves, etc. In one embodiment, a size (e.g., a diameter) of fibers in a first set of layers (i.e., unidirectional tow layers 162) is equal to a size of fibers in a second set of layers (i.e., braided tow layers 164).

Illustrative details of the operation of hybrid layup system 110 will be discussed with regard to FIG. 2. Assume, for this embodiment, that hybrid layup system 110 is disposed above the mandrel 150, and is about to perform layup of a laminate.

Figure 2:
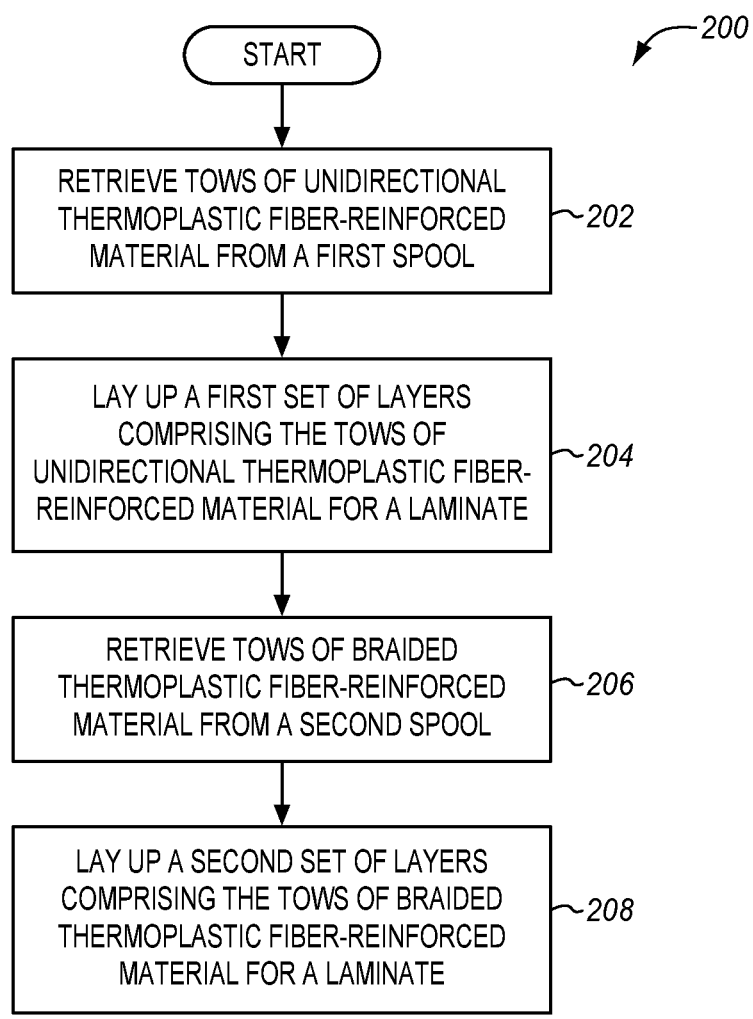
FIG. 2 is a flowchart illustrating a method for operating a hybrid layup system in an illustrative embodiment.

FIG. 2 is a flowchart illustrating a method 200 for operating a hybrid layup system in an illustrative embodiment. The steps of method 200 are described with reference to hybrid layup system 110 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 112 operates the end effector 136 to retrieve tows of unidirectional fiber-reinforced material from a first spool. In one embodiment, this comprises drawing the tows via pinch rollers (not shown) at the end effector 136. The feed rate may be any desired rate, such as several feet per minute or more.

In step 204, controller 112 lays up a first set of layers comprising the tows of unidirectional thermoplastic fiber-reinforced material for the laminate 160. In one embodiment, this comprises operating the end effector 136 according to instructions in an NC program stored in memory 114. This comprises dispensing and cutting segments from the tows at directions and orientations indicated by the NC program. In further embodiments, the tows may occupy each of multiple lanes which are separately dispensed and cut.

In step 206, controller 112 operates the end effector 138 to retrieve tows of braided thermoplastic fiber-reinforced material from a second spool. In one embodiment, this comprises drawing the tows via pinch rollers (not shown) at the end effector 138. The feed rate may be any desired rate, such as several feet per minute or more. In one embodiment, step 206 is performed synchronously with step 202, while in further embodiments, step 206 is performed independently of step 202.

In step 208, controller 112, lays up a second set of layers comprising the tows of braided thermoplastic fiber-reinforced material for the laminate 160. In one embodiment, this comprises operating the end effector 138 according to instructions in an NC program stored in memory 114. This comprises dispensing and cutting segments from the tows at a direction and orientation indicated by the NC program. In further embodiments, the tows may occupy each of multiple lanes which are separately dispensed and cut. In some embodiments, laying up the second set of layers is performed at a location where the laminate will be induction welded to another laminate.

Laying up the second set of layers may further comprise steering the tows of braided thermoplastic fiber-reinforced material. For example, controller 112 may operate the end effector 136 and the end effector 138 during layup, and may steer the second set of layers while the end effector 138 is laying up of the second set of layers. Steering a braided tow is beneficial in comparison to steering a unidirectional tow, because fibers within the braided tow shift more easily with respect to each other and are easier to place into shear than an entire sheet of fabric.

Method 200 provides an advantage over prior systems and techniques because it enables the crafting of composites having both woven layers and unidirectional layers. Furthermore, because the braided layers are formed from tows (and not from a single continuous prefabricated sheet), the tows may be laid-up to form a braided layer of any desired size. Method 200 also provides a substantial advantage in facilitating induction welding, which is discussed below.

Figure 3A:
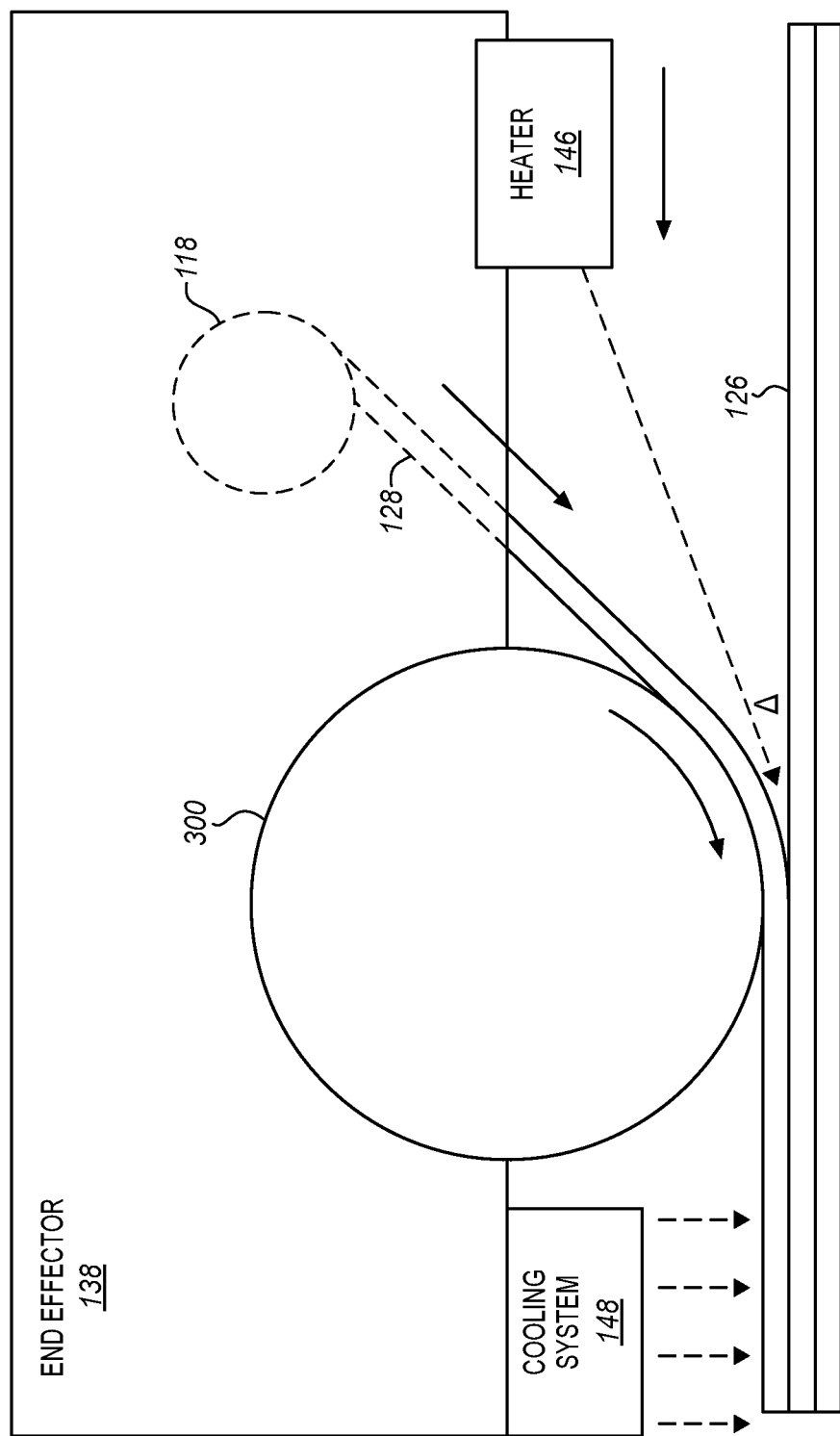
FIG. 3A is a side view of an end effector laying up tows of braided fibers onto a laminate consisting of tows of unidirectional fibers in an illustrative embodiment.

FIG. 3A is a side view of an end effector 138 laying up braided tows 128 of braided fibers onto a laminate consisting of unidirectional tows 126 (made of unidirectional fibers) in an illustrative embodiment. According to FIG. 3, braided tows 128, which are arranged into one or more lanes for layup at end effector 138, are heated by heater 146. This increases the temperature of the braided tows 128 to a tacking temperature (e.g., a temperature within thirty degrees Fahrenheit of a melting temperature of thermoplastic in the braided tows 128). In a further embodiment, heaters heat the layers of a laminate to a melting temperature of the thermoplastic while laying up the layers. Compaction roller 300 presses the braided tows 128 onto the laminate, and cooling system 148 applies a cooling fluid (e.g., room temperature air at a high volumetric flow rate, water, etc.) to the surface of the braided tows 128 after compaction by compaction roller 300.

Figure 3B:
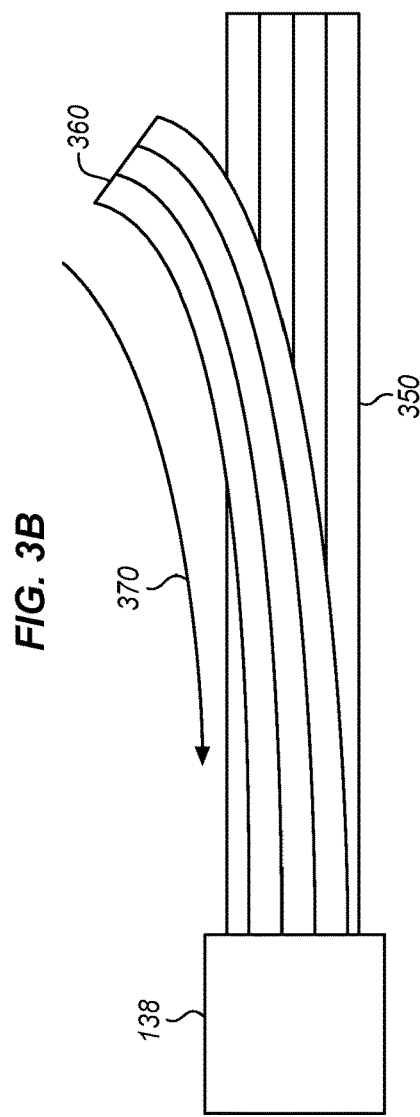
FIG. 3B is a top view of an end effector laying up tows of braided fibers onto a laminate consisting of tows of unidirectional fibers in an illustrative embodiment.

FIG. 3B is a top view of an end effector 138 laying up tows of braided fibers onto a laminate consisting of tows of unidirectional fibers in an illustrative embodiment. According to FIG. 3B, the end effector 138 moves along a curve 370 while placing tows 360, performing what is known as "steering" of the tows 360. This enables the tows 360 to match complex contours, and to vary from tows 350 in underlying layers.

Figure 4:
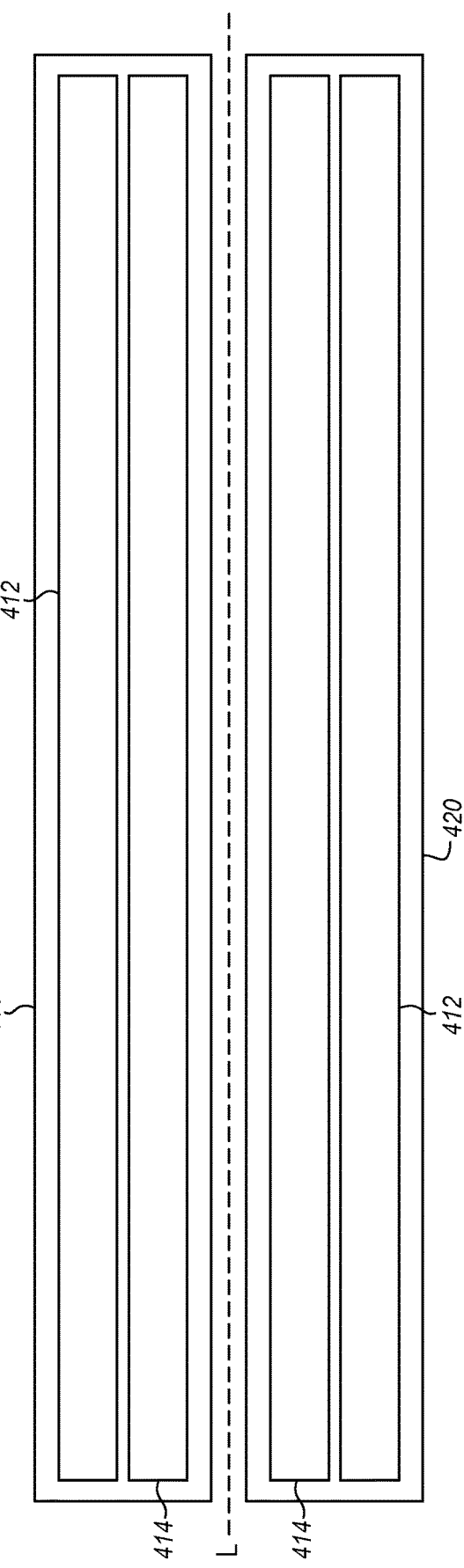
FIGS. 4-6 are side views of laminates that include tows of braided fibers along a location at which induction welding will occur in an illustrative embodiment.
Figure 5:
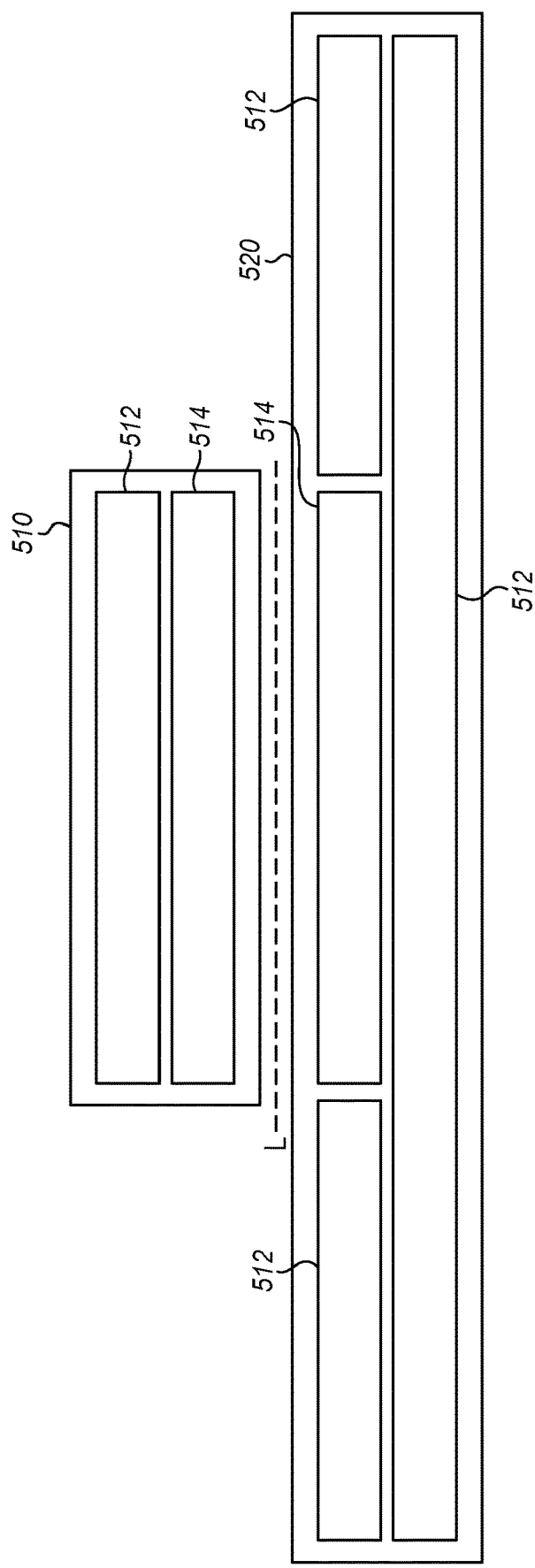
Figure 6:
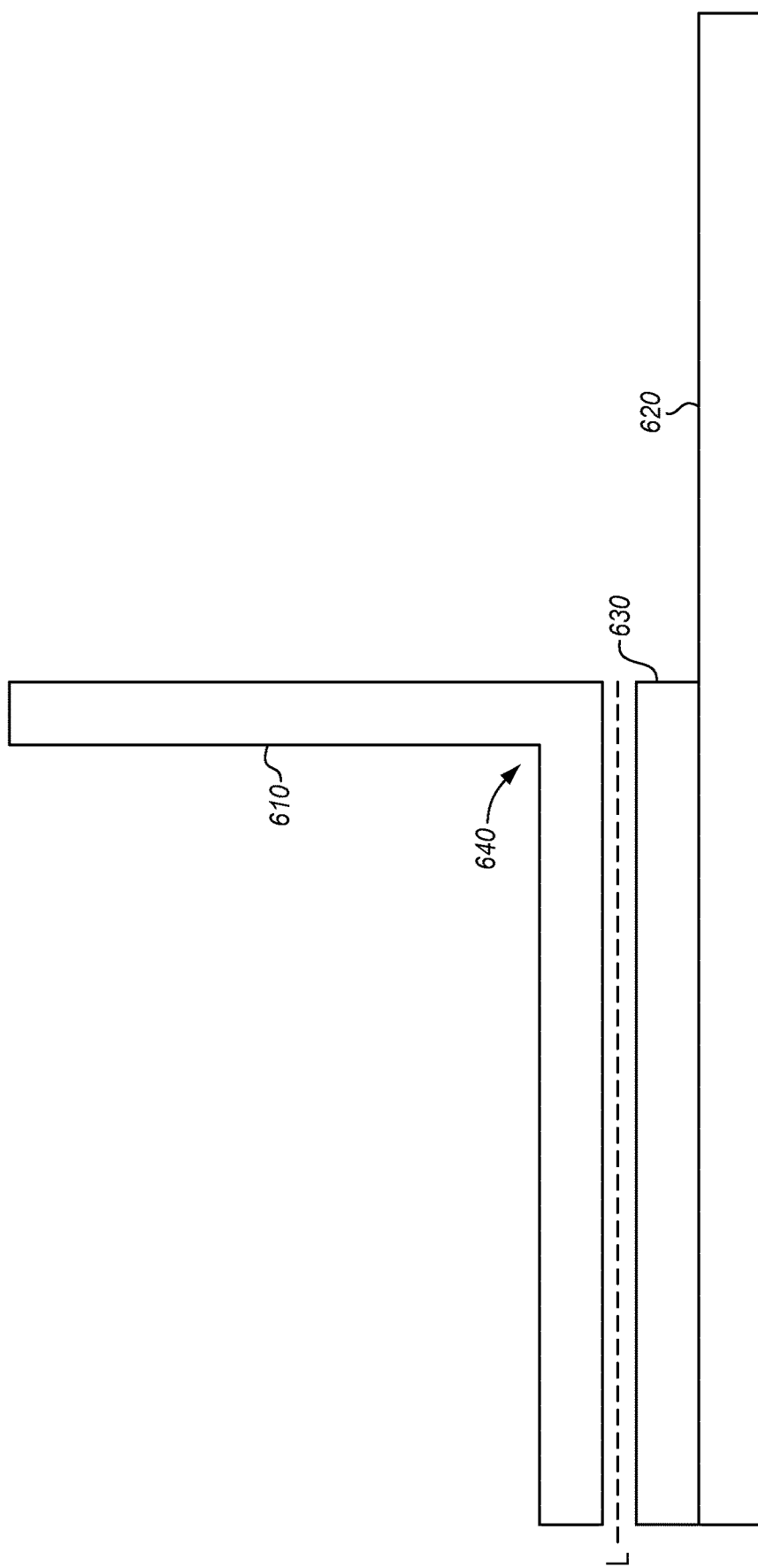

FIGS. 4-6 are side views of laminates that include tows of braided fibers along a location at which induction welding will occur in an illustrative embodiment. Specifically, FIG. 4 illustrates laminate 410 and laminate 420 arranged for an induction weld along a line L in an illustrative embodiment. As shown in FIG. 4, layers 414 of laminate 410 and laminate 420 are disposed proximate to the line L. These layers 414 comprise tows of braided fiber. In embodiments where the fiber is made from an electrically conductive material such as carbon fiber, intersections between the fibers experience inductive heating when exposed to a magnetic field. This in turn increases a temperature of the laminates 410 and 420 proximate to the line L to a temperature above a melting temperature of thermoplastic in the laminates, which facilitates induction welding. Hence, a benefit in induction welding is achieved even though layers 412 comprise tows of unidirectional fiber.

FIG. 5 illustrates a variation of FIG. 4, wherein a laminate 510 and a laminate 520 are arranged for an induction weld to be formed along a line L. As shown in FIG. 5, layer 514 of braided fibers is disposed at the line L, and is adjacent to layers 512 of unidirectional fiber to the left and right. This arrangement localizes the region which experiences the most inductive heating during an induction weld.

In FIG. 6, a layer 630 of braided fibers is provided, in order to facilitate an induction weld that forms an elbow joint 640. As shown in FIG. 6, an elbow-shaped laminate 610 is induction welded along line L to a flat laminate 620. Layer 630 is disposed between the two laminates along the line L. When exposed to a magnetic field, such as during an induction weld, intersections between fibers in layer 630 act as susceptors and generate heat. This heat melts thermoplastic in the neighboring laminates, which commingles thermoplastic between the laminates. Upon solidification of the thermoplastic, the laminates are united into a single composite part.

Figure 7:
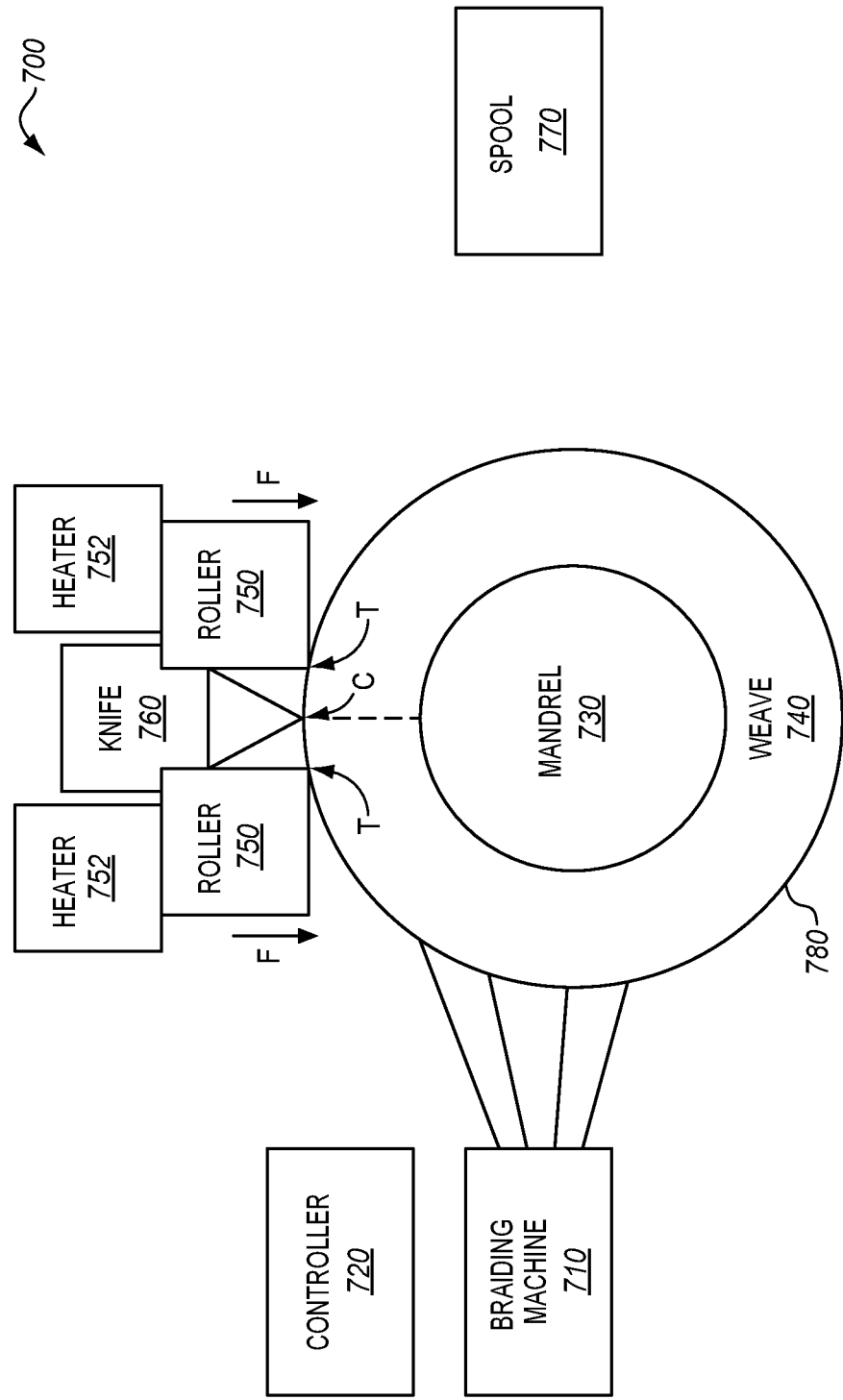
FIG. 7 is a block diagram of a fabrication system for creating tows of braided fibers in an illustrative embodiment.

FIG. 7 is a block diagram of a fabrication system 700 for creating tows of braided fibers in an illustrative embodiment. Fabrication system 700 comprises any system or device that is capable of cutting a woven/braided preform having a closed cross-sectional shape, and winding the preform onto a spool for later layup onto a laminate.

In this embodiment, fabrication system 700 includes controller 720, which operates fabrication system 700 in accordance with a Numerical Control (NC) program. Controller 720 may be implemented, for example, as custom circuitry, as a hardware processor executing programmed instructions, or some combination thereof.

Braiding machine 710 comprises a three-dimensional braiding machine that braids unidirectional tows of material into a three-dimensional braid. For example, braiding machine 710 may include spools which each provide unidirectional fibers, and that orbit each other in predefined patterns in order to braid those fibers into a weave 740 that is formed about a mandrel 730 and that has a desired pattern. Upon completion of the weave 740, the weave 740 is wrapped around mandrel 730, has a circumference 780, and may extend for tens or hundreds of feet (in a direction proceeding into the page).

After braiding, weave 740 is cut (e.g., as explained with regard to FIG. 9 below) and removed from the mandrel 730. To facilitate this process, rollers 750 are heated by heaters 752, and increase a temperature of the weave 740 to a tacking temperature of a thermoplastic within the weave 740. The rollers also apply force F pushing the weave 740 into the mandrel 730 at tacking locations T. After rollers 750 proceed (e.g., in a direction proceeding into the page), the thermoplastic cools and adheres the thermoplastic to the mandrel. This prevents the weave 740 from sliding when the weave 740 is cut. Knife 760 cuts the weave 740 along a cut location C. The weave 740 is then released from the mandrel 730, and is wound about the spool 770. When it is wound about the spool 770, the circumference of the weave 740 is uncurled and pressed flat.

Figure 8:
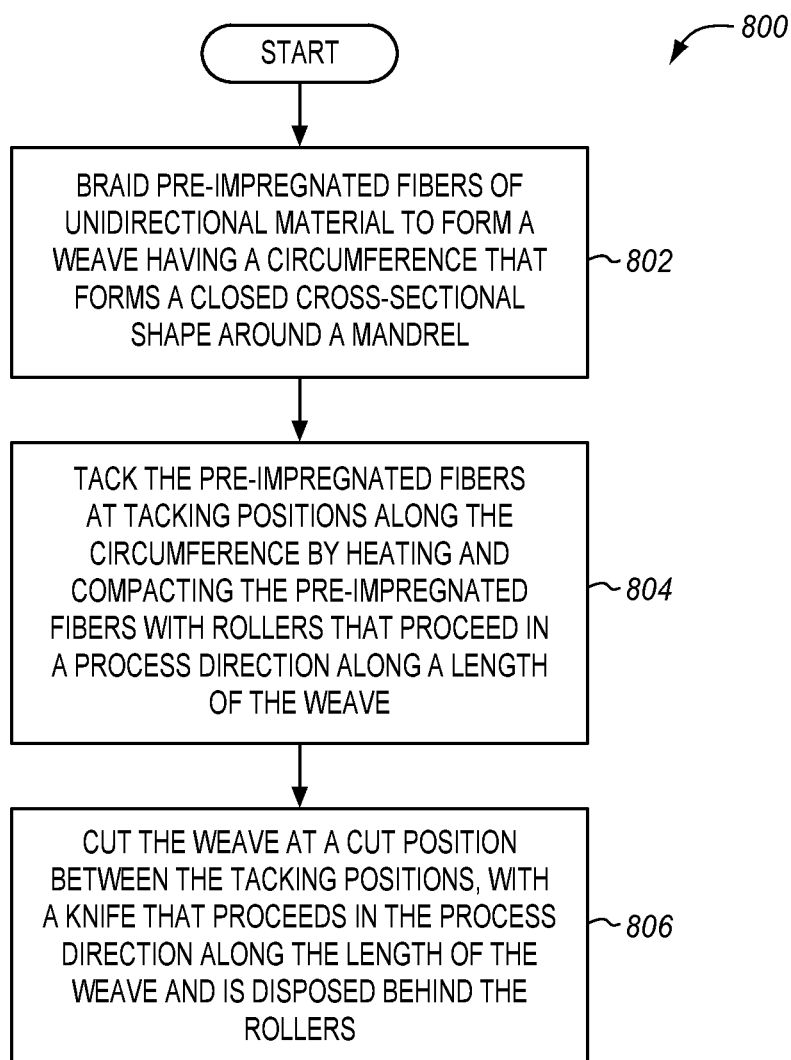
FIG. 8 is a flowchart illustrating a method for operating a fabrication system to create tows of braided fibers in an illustrative embodiment.

FIG. 8 is a flowchart illustrating a method 800 for operating a fabrication system to create tows of braided fibers in an illustrative embodiment. According to FIG. 8, step 802 includes braiding pre-impregnated fibers of unidirectional material to form a weave having a circumference that forms a closed cross-sectional shape (e.g., a circle, an ellipse, a square) around a mandrel. In one embodiment, this step is performed by an industrial three-dimensional braiding machine operating in accordance with an NC program.

In step 804, the pre-impregnated fibers are tacked at tacking positions along the circumference of the weave 740, by heating and compacting the pre-impregnated fibers with rollers 750 that proceed in a process direction along a length of the weave (e.g., by heating and compacting surface layers, or all layers at the weave). The tacking process adheres the weave 740 at the tacking positions. This means that the weave 740 is secured, and resists sliding along the mandrel 730 when the weave 740 is cut.

Step 806 includes cutting the weave 740 at the cut position between the tacking positions, with a knife 760 that proceeds along the weave 740 and is disposed behind the rollers 750. This cut opens the weave 740, enabling the weave to be flattened and rolled/taken up onto a spool.

Figure 9:
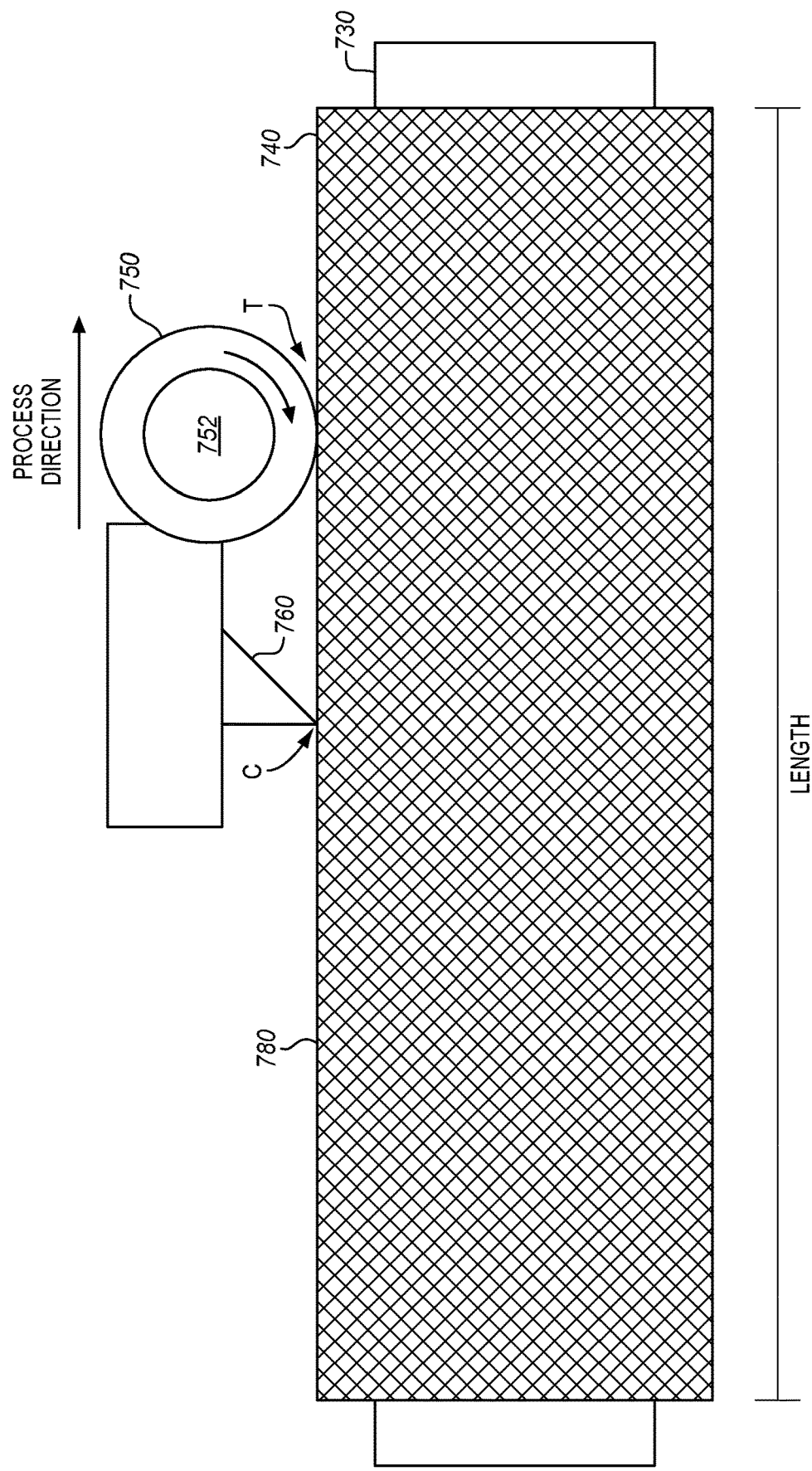
FIG. 9 is side view of the fabrication system of FIG. 7 cutting a closed-weave of braided fibers to form a tow of material in an illustrative embodiment.

FIG. 9 is side view of the fabrication system of FIG. 7 cutting a weave 740 of braided fibers to form a tow of material in an illustrative embodiment. As shown in FIG. 9, roller 750 is heated by heater 752 and compacts the weave 740 onto the mandrel 730. As the roller 750 proceeds in a process direction, a knife 760 follows and cuts the weave 740. The weave 740 is then pulled off of the mandrel 730 (e.g., forward, downward, etc., breaking any tacking that secures the weave 740 to the mandrel 730). A circumference 780 of the weave 740 is flattened into a planar shape, and the weave 740 is rolled onto a spool such that each turn of the spool acquires more of the length of the weave 740 (i.e., its longitudinal length is rolled onto the spool).

Figure 10:
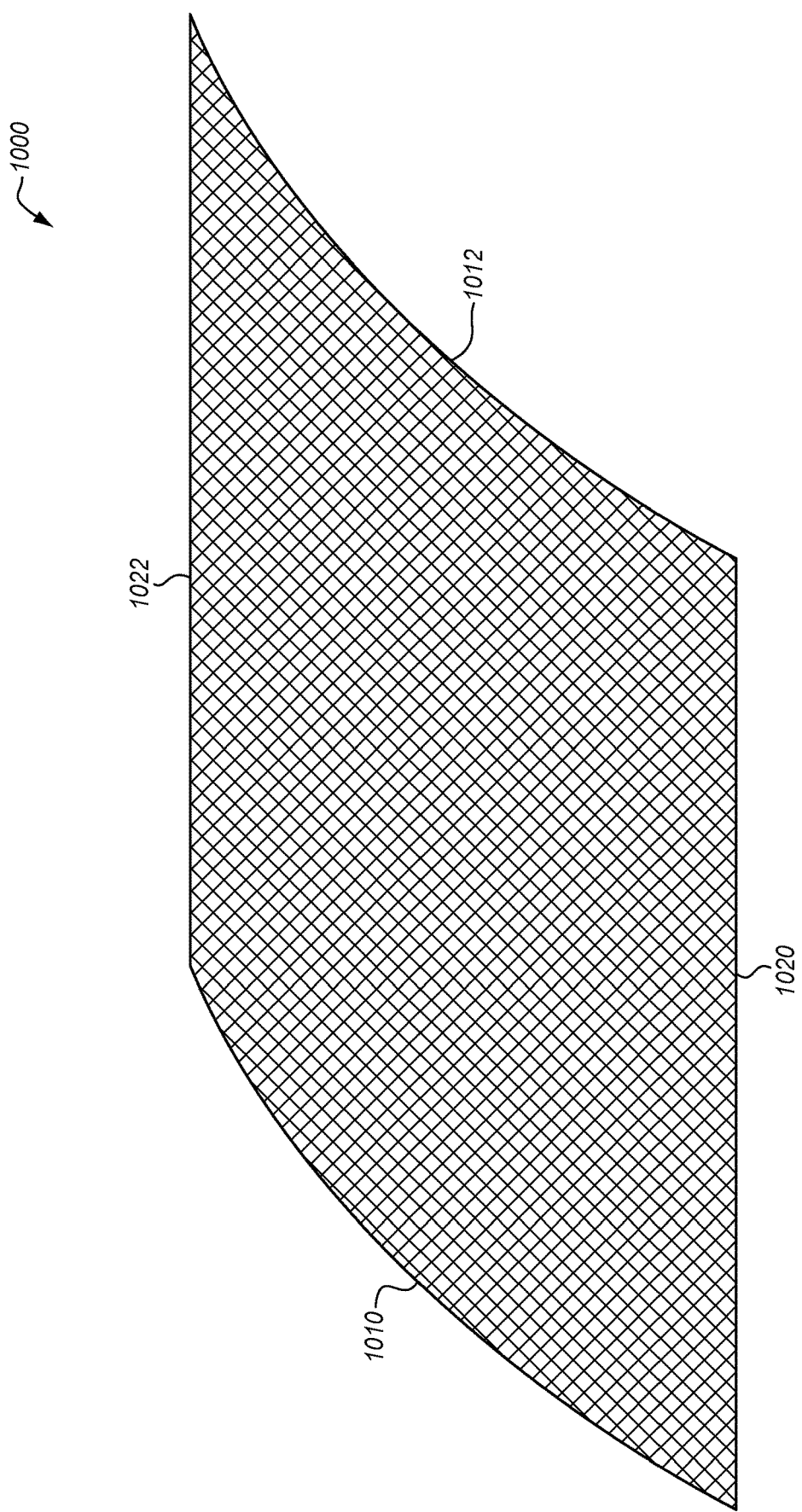
FIG. 10 is a perspective view of a weave that has been cut and removed from a mandrel in an illustrative embodiment.

FIG. 10 is a perspective view of a weave 1000 that has been cut and removed from a mandrel in an illustrative embodiment. In this embodiment, the weave 1000 includes side 1010 and side 1012, as well as cut edge 1020 and cut edge 1022. The weave 1000 has been flattened into a planar shape (e.g., by a press), although some curvature remains in the illustration to distinguish the sides of the weave from the cut edges.

In one embodiment, the weave 1000 is rolled onto a spool by placing a first cut edge (e.g., cut edge 1020) of the weave in contact with the spool, rolling the spool to take up the sides (e.g., side 1010 and side 1012) of the weave, and finishing by placing a second cut edge (e.g., cut edge 1022) of the weave at the spool. In a further embodiment, the weave 1000 is rolled onto a spool by placing a first side (e.g., side 1010) of the weave in contact with the spool, rolling the spool to take up the cut edges (e.g., cut edge 1020 and cut edge 1022) of the weave, and finishing by placing a second side (e.g., side 1012) of the weave at the spool.

EXAMPLES

In the following examples, additional processes, systems, and methods are described in the context of a fabrication and layup system for hybrid composite parts.

Figure 11:
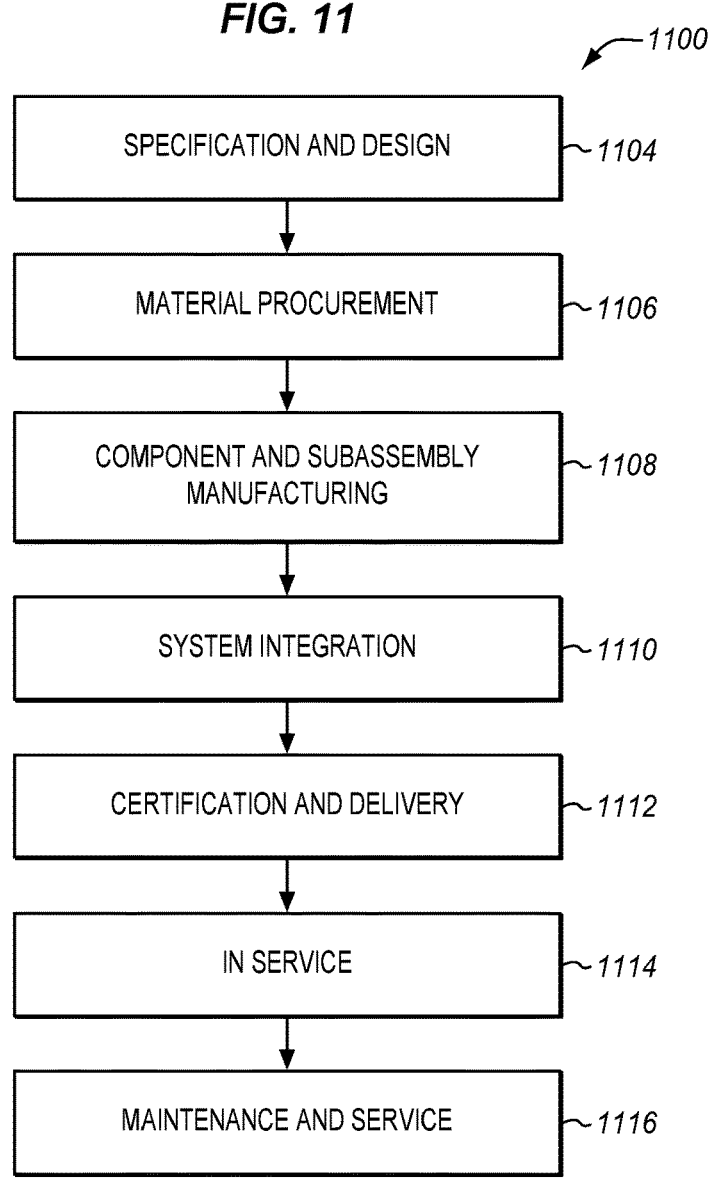
FIG. 11 is a flow diagram of aircraft production and service methodology in an illustrative embodiment.
Figure 12:
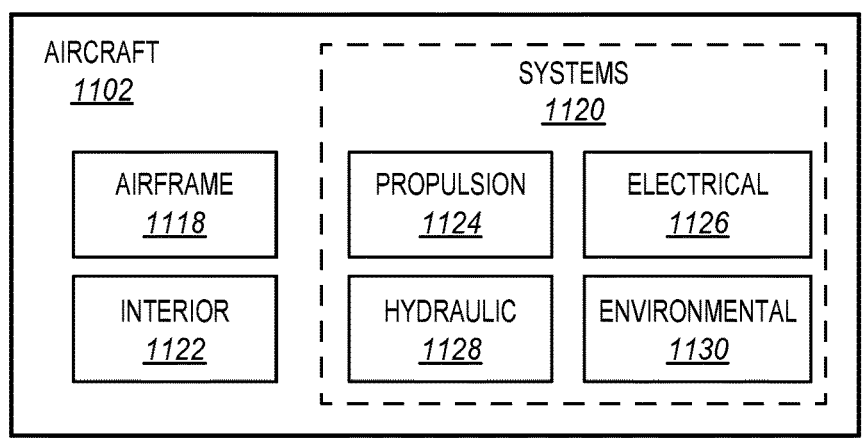
FIG. 12 is a block diagram of an aircraft in an illustrative embodiment.

Referring more particularly to the drawings, embodiments of the disclosure may be described in the context of aircraft manufacturing and service in method 1100 as shown in FIG. 11 and an aircraft 1102 as shown in FIG. 12. During pre-production, method 1100 may include specification and design 1104 of the aircraft 1102 and material procurement 1106. During production, component and subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine work in maintenance and service 1116 (which may also include modification, reconfiguration, refurbishment, and so on). Apparatus and methods embodied herein may be employed during any one or more suitable stages of the production and service described in method 1100 (e.g., specification and design 1104, material procurement 1106, component and subassembly manufacturing 1108, system integration 1110, certification and delivery 1112, service 1114, maintenance and service 1116) and/or any suitable component of aircraft 1102 (e.g., airframe 1118, systems 1120, interior 1122, propulsion system 1124, electrical system 1126, hydraulic system 1128, environmental system 1130).

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 1102 produced by method 1100 may include an airframe 1118 with a plurality of systems 1120 and an interior 1122. Examples of systems 1120 include one or more of a propulsion system 1124, an electrical system 1126, a hydraulic system 1128, and an environmental system 1130. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1100. For example, components or subassemblies corresponding to component and subassembly manufacturing 1108 may be fabricated or manufactured in a manner similar to components or subassemblies produced while the aircraft 1102 is in service. Also, one or more apparatus embodiments, method embodiments, or a combination thereof may be utilized during the subassembly manufacturing 1108 and system integration 1110, for example, by substantially expediting assembly of or reducing the cost of an aircraft 1102. Similarly, one or more of apparatus embodiments, method embodiments, or a combination thereof may be utilized while the aircraft 1102 is in service, for example and without limitation during the maintenance and service 1116. For example, the techniques and systems described herein may be used for material procurement 1106, component and subassembly manufacturing 1108, system integration 1110, service 1114, and/or maintenance and service 1116, and/or may be used for airframe 1118 and/or interior 1122. These techniques and systems may even be utilized for systems 1120, including, for example, propulsion system 1124, electrical system 1126, hydraulic system 1128, and/or environmental system 1130.

In one embodiment, a part comprises a portion of airframe 1118, and is manufactured during component and subassembly manufacturing 1108. The part may then be assembled into an aircraft in system integration 1110, and then be utilized in service 1114 until wear renders the part unusable. Then, in maintenance and service 1116, the part may be discarded and replaced with a newly manufactured part. Inventive components and methods may be utilized throughout component and subassembly manufacturing 1108 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating tows of braided thermoplastic fiber-reinforced material, the method comprising:
    braiding pre-impregnated fibers of unidirectional material to form a weave having a circumference that forms a closed cross-sectional shape around a mandrel;
    tacking the pre-impregnated fibers at tacking positions along the circumference with a pair of spaced apart rollers that proceed in a process direction; and
    cutting the weave at a cut position between the tacking positions, with a knife that proceeds in the process direction along the length of the weave and is disposed behind the rollers.

2. The method of claim 1 wherein:
    the braiding comprises three-dimensionally braiding the pre-impregnated fibers.

3. The method of claim 1 wherein:
    the closed cross-sectional shape is a circle.

4. The method of claim 1 further comprising:
    heating the pre-impregnated fibers by increasing a temperature of the pre-impregnated fibers to a melting temperature of the thermoplastic.

5. The method of claim 1 further comprising:
    removing the weave from the mandrel;
    flattening the weave into a planar shape having two cut edges and two sides; and
    rolling the weave onto a spool, by placing a first cut edge of the weave in contact with the spool, rolling the spool to take up the sides of the weave, and finishing by placing a second cut edge of the weave at the spool.

6. The method of claim 1 further comprising:
    removing the weave from the mandrel;
    flattening the weave into a planar shape having two cut edges and two sides; and
    rolling the weave onto a spool, by placing a first side of the weave in contact with the spool, rolling the spool to take up the cut edges of the weave, and finishing by placing a second side of the weave at the spool.

7. The method of claim 1 wherein:
    the weave comprises an open weave.

8. The method of claim 1 wherein:
    tacking is performed by heating and compacting the pre-impregnated fibers with rollers that proceed in a process direction along a length of the weave.

9. The method of claim 1 wherein:
    the weave comprises a cylindrical braided structure.

10. The method of claim 1, wherein:
    the method is executed by a processor in accordance with instructions in a non-transitory computer readable medium.

11. The method of claim 10 wherein:
    the braiding comprises three-dimensionally braiding the pre-impregnated fibers.

12. The method of claim 10 wherein:
    the closed cross-sectional shape is a circle.

13. The method of claim 10 wherein:
    heating the pre-impregnated fibers comprises increasing a temperature of the pre-impregnated fibers to a melting temperature of the thermoplastic.

14. The method of claim 10 wherein the method further comprises:
    removing the weave from the mandrel;
    flattening the weave into a planar shape having two cut edges and two sides; and
    rolling the weave onto a spool, by placing a first cut edge of the weave in contact with the spool, rolling the spool to take up the sides of the weave, and finishing by placing a second cut edge of the weave at the spool.

15. The method of claim 10 wherein the method further comprises:
    removing the weave from the mandrel;
    flattening the weave into a planar shape having two cut edges and two sides; and
    rolling the weave onto a spool, by placing a first side of the weave in contact with the spool, rolling the spool to take up the cut edges of the weave, and finishing by placing a second side of the weave at the spool.

16. The method of claim 10 wherein:
    the weave comprises an open weave.

17. The method of claim 10 wherein:
    tacking is performed by heating and compacting the pre-impregnated fibers with rollers that proceed in a process direction along a length of the weave.

18. The method of claim 10 wherein:
    the weave comprises a cylindrical braided structure.

19. The method of claim 1 wherein:
    braiding the pre-impregnated fibers of unidirectional material comprises braiding carbon fibers.

20. The method of claim 1 wherein:
    the pre-impregnated fibers of unidirectional material are pre-impregnated with thermoset resin.

21. The method of claim 1 wherein:
    the pre-impregnated fibers of unidirectional material are pre-impregnated with thermoplastic resin.

22. The method of claim 1 wherein:
    braiding is performed by a braiding machine that includes spools which each provide unidirectional fibers.

23. The method of claim 22 wherein:
    during braiding, the spools orbit each other in predefined patterns.

24. The method of claim 1 further comprising:
    rolling the weave onto a spool such that each turn of the spool acquires more of the length of the weave.

25. The method of claim 1 further comprising:
    flattening the weave by operation of a press.

26. The method of claim 1 further comprising:
    induction welding the weave.

27. The method of claim 1 further comprising:
    operating an end effector to lay up tows of braided fibers.

28. The method of claim 27 further comprising:
    moving the end effector along a curve while placing the tows.

29. The method of claim 27 further comprising:
    arranging the tows into one or more lanes for layup.

30. An apparatus for fabricating tows of braided thermoplastic fiber-reinforced material, the apparatus comprising:
    a weave of braided pre-impregnated fibers of unidirectional material disposed at a cylindrical mandrel;
    rollers that apply heat and pressure at tacking positions along a circumference of the weave at the cylindrical mandrel, and that proceed in a process direction along a length of the weave; and
    a knife that cuts the weave at a cut position between the tacking positions, proceeds in the process direction along the length of the weave, and is disposed behind the rollers.

31. The apparatus of claim 30 further comprising:
heaters that heat the rollers to a melting temperature of thermoplastic in the weave.

32. The apparatus of claim 30 further comprising:
a spool that takes up the weave after the weave has been cut.

33. Fabricating a portion of an aircraft using the apparatus of claim 30.

* * * * *